United States Patent [19]

Erickson et al.

[11] Patent Number: 5,420,574

[45] Date of Patent: May 30, 1995

[54] CHANNEL ALLOCATION MECHANISM

[75] Inventors: Paul M. Erickson, Hanover Park;
Leopold Alonso, Hoffman Estates;
Timothy J. Wilson, Schaumburg;
Angela T. Johnston, Chicago, all of Ill.

[73] Assignee: Motorola, Inc., Schaumburg, Ill.

[21] Appl. No.: 576,809

[22] Filed: Sep. 4, 1990

[51] Int. Cl.6 .............................................. H04Q 1/00
[52] U.S. Cl. ........................ 340/825.03; 340/825.08;
340/827; 370/95.1; 370/85.7; 455/34.1; 379/63
[58] Field of Search ................... 340/825.03, 825.44,
340/825.08, 827; 370/95.1, 85.7; 379/58, 63, 60;
455/34, 33, 54, 56, 58

[56] References Cited

U.S. PATENT DOCUMENTS

| Re. 32,789 | 11/1988 | Lynk Jr. et al. | 455/34 X |
|---|---|---|---|
| 3,898,390 | 9/1975 | Wells et al. | 455/33 |
| 4,554,677 | 12/1985 | Smith et al. | 455/34 X |
| 4,590,473 | 5/1986 | Burke et al. | 340/825.52 |
| 4,726,050 | 2/1988 | Menich et al. | 379/60 |
| 4,831,373 | 5/1989 | Hess | 340/825.03 |
| 4,837,858 | 6/1989 | Ablay et al. | 455/34 |
| 4,870,408 | 9/1989 | Zdunek et al. | 340/825.03 |
| 4,879,541 | 11/1989 | Stefaniu et al. | 340/825.07 |
| 4,940,974 | 7/1990 | Sojka | 455/34 X |
| 5,042,027 | 8/1991 | Takase | 340/827 |

Primary Examiner—Donald J. Yusko
Assistant Examiner—Brian Zimmerman
Attorney, Agent, or Firm—Susan L. Lukasik; Steven G. Parmelee

[57] ABSTRACT

A channel allocation mechanism especially useful in a trunked communication system that can accommodate both voice and data signals, and that operates in true trunked manner to efficiently utilize spectral resources.

32 Claims, 3 Drawing Sheets

CHANNEL ALLOCATION MECHANISM

FIELD OF THE INVENTION

This invention is concerned with trunked communication systems.

More particularly, this invention is concerned with efficient channel allocation and deallocation for data and voice in a trunked communication system.

BACKGROUND OF THE INVENTION

Trunked RF communication systems exist to effectively allocate limited channel resources among a plurality of subscriber units. This is accomplished by reusing the same set of available RF frequencies over many different subscriber groups. A central controlling computer, with knowledge of the currently available RF frequencies receives channel allocation requests from subscriber units on an RF control channel. This computer then assigns a voice channel on a predetermined basis to the requesting subscriber unit's group of users.

In a basic RF trunked system, there exists a high degree of flexibility to partition voice conversations between different groups so that no one group of users is specifically aware when another group of users makes use of the system. Typically, these groups are divided into subgroups so that calls may be made upon either a group, subgroup or individual basis depending upon the type of communication desired by an initiating subscriber.

To establish a voice communication between a group of subscriber units operating on a trunked system, a subscriber unit transmits a data packet called an ISW (Inbound Signalling Word) on a control channel that is maintained for such purposes. The ISW contains at least the requesting subscriber unit's unique ID code, which may contain or be used to obtain the requesting subscriber's current talk-group. The request is forwarded to a TCC (Trunked Central Controller, also known as a central controller), which decodes the request and transmits on the control channel a data packet called an OSW (Outbound Signalling Word) to all subscriber units, which continuously monitor the control channel when not participating in a voice conversation. The OSW is a channel grant that contains the talk-group code of the requesting subscriber unit and the voice channel number assigned for the conversation. The OSW causes the requesting subscriber unit to move to the voice channel and commence transmitting, while simultaneously causing all other subscriber units in the same talk-group to move to the voice channel as listening units. In this way, a group call is set up. If, however, all voice channels are in use when a subscriber unit transmits an ISW, the TCC typically sends the requesting subscriber a Busy OSW.

In addition to voice messages, it is desirable to send data information across a trunked radio channel. In some data systems, a subscriber obtains a trunked data communication channel via the same procedure used to obtain a voice channel. However, this practice is inefficient and spectrally wasteful, due to the time it takes for a requesting subscriber to transmit an ISW and receive a channel grant OSW from the TCC, and the time it takes to set up and terminate a call on a voice channel. At contemporary data transmission rates, it is anticipated that an entire typical data message would take substantially less time to transmit than the time required to obtain a channel (approximately 0.5 seconds). Thus, assigning a data channel pursuant to the same procedure as assigning a voice channel would be wasteful of spectrum and consume precious system time that could be better used to transmit data messages.

Other trunked communication systems desirous to accommodate data traffic have permanently dedicated one or more channels to handling data traffic. While this avoids the access time problem noted above, this technique is contrary to the basic principles of trunked communication systems, which strive to allocate channel resources across a plurality of users as required. Therefore, the practice of having dedicated data channels, permanently removed from the channel allocation pool of frequencies, is wasteful of spectral resources and leads to inefficient system operation. Moreover, dedicated data channel systems lack the capacity to dynamically redistribute or allocate the data traffic load across the available data channels. Such systems typically permanently assign a subscriber unit to a data channel, thereby building in future problems as the number of data subscribers increases on a particular channel.

Placing a fixed timer on the data channel, thereby allotting a fixed amount of time for a data transmission, allows for the data channel to be deallocated (released) after a certain amount of time. The drawbacks of this method are that if the fixed time is too long, the channel will never be released, and if the fixed time is too short, important messages are likely to be truncated or lost.

Accordingly, there exists a need for a trunked communication system that can accommodate both voice and data message formats, and that operates in true trunked manner to efficiently utilize spectral resources.

DETAILED DESCRIPTION OF THE PREFERRED EMBODIMENT

Figure 1:
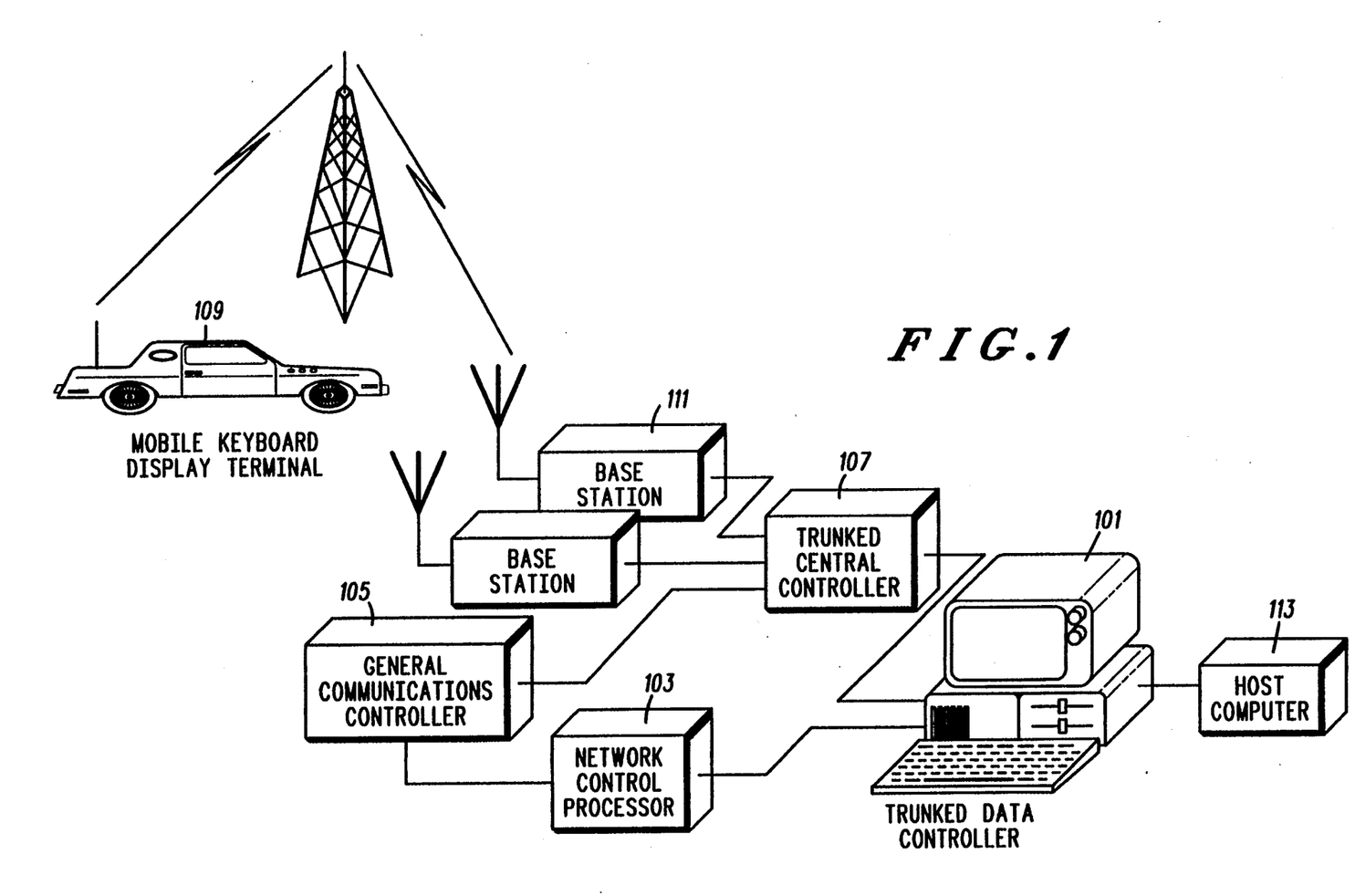
FIG. 1 is a block diagram of a trunked radio system in accordance with the invention.

The preferred embodiment of the invention resides in the TDC (Trunked Data Controller), such as a TDC3000 available from Motorola, Inc. The TDC (101) is located in the memory of a personal computer, such as a PC386 available from IBM, as shown in FIG. 1. The TDC controls the seizing of a specified base station (111), such as an MSF5000 available from Motorola, Inc., for data operation, the release of the same, and the release of the associated trunking channel. The seize and release of the station is accomplished via commands from the TDC to the NCP, Network Control Processor (103), such as an NCP3000 available from Motorola, Inc., then transparently to the GCC, General Communication Controller (105), such as a GCC480 available from Motorola, Inc. The deallocation of the channel is handled via a command to the TCC, Trunked Central Controller (107), such as a T5184 with console interface option D431 available from Motorola, Inc. These operations are triggered by channel allocation grants from the TCC, inbound data messages from the mobile KDT, Keyboard Display Terminal (109), acknowledges to outbound data messages to the KDT(s), data messages to/from the GCC, and internal timed events. The TDC is connected to the system user's host computer (113), RS232 compatible.

In the preferred embodiment of the invention, the subscriber unit is a KDT, such as a KDT480C available from Motorola, Inc. attached to a trunked mobile, such as a Smartnet MaxTrac Mobile with data option available from Motorola, Inc. This mobile KDT pair will be referred to as a terminal in the preferred embodiment. The convention defining Inbound and Outbound messages shall be with respect to the fixed end (i.e., base station) of the system. For example, an Inbound message begins at the terminal and an Outbound message is destined for the terminal.

The preferred embodiment of the invention allocates channels in an RF trunked communication system to both voice and data message formats. The TDC uses the procedure described in the following paragraphs to mark the channel state as up, assigned as a data channel, or down, not assigned as a data channel. Here, a down channel may be assigned as a voice channel. An up channel need not have its base station keyed.

The TDC maintains in its memory two lists of terminal IDs, one for Inbound messages and one for Outbound messages. The Inbound queue has a timer associated with each terminal ID. The Outbound queue has a counter as well as a timer associated with each terminal ID. The TDC keeps an Inbound and Outbound queue, collectively called the channel queues, for each data capable channel in the system.

Processing for each channels queues occurs as follows. A terminal ID is added to the Inbound queue when the TDC receives an Individual Data Channel Grant, i.e. OSW, for that terminal. The TDC seizes the channel, if necessary, and starts a timer with the time that the specified channel will be maintained for that terminal to allow for long multisegment inbound data messages and unreliable transmission (i.e., 20 seconds). After an Inbound Message is received by the TDC, the timer for that terminal is changed to a much smaller value (i.e., 0 seconds) to allow the terminal to transmit multiple messages before the channel is taken down. Every time an Inbound Message is received, the timer is reset with the short value. If a Channel Registration Message (a message from a terminal to the TDC stating that the terminal has transmitted and is ready to receive) is received from a terminal, that terminal ID is removed from the Inbound queue and is added to the Outbound queue, and the number of currently outstanding messages are stored with the terminal ID. A terminal ID is removed from the Inbound queue whenever the terminal's associated timer expires.

On entering a terminal ID into the Outbound queue, the TDC maintains a message counter as well as a timer. The TDC starts a timer with the time that the specified channel will be maintained for that terminal to receive an outbound message and acknowledge during unreliable transmission (i.e., 20 seconds). While a terminal ID is listed on the Outbound queue, the TDC is allowed to forward outbound data messages to that terminal. The timer is reset on each transmission. When the counter reaches zero for a terminal, a Return to Voice message is sent to that terminal telling it to move back to the voice control channel and the timer is set to the hang time value for the channel (i.e., 1 second). Hang time is the period that the channel is allocated although nothing is being transmitted. A terminal ID is removed from the Outbound queue whenever the terminal's associated timer expires.

Once the Inbound queue and the outbound queue for a channel reach a predetermined level (i.e., empty), the TDC releases and deallocates the associated channel.

Figure 2A:
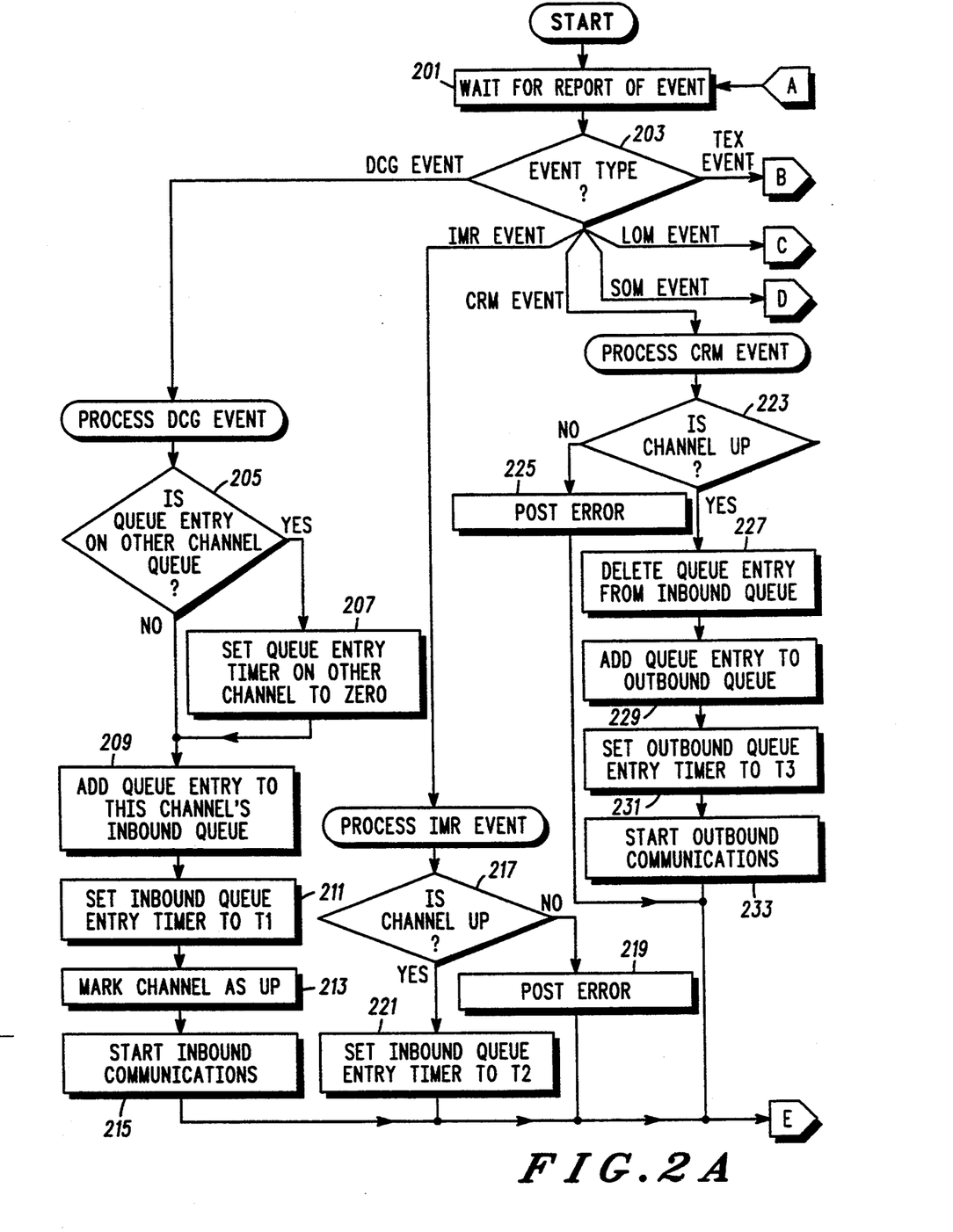
FIGS. 2A and 2B depict a flowchart illustrating the steps executed to efficiently allocate channels in accordance with the invention.
Figure 2B:
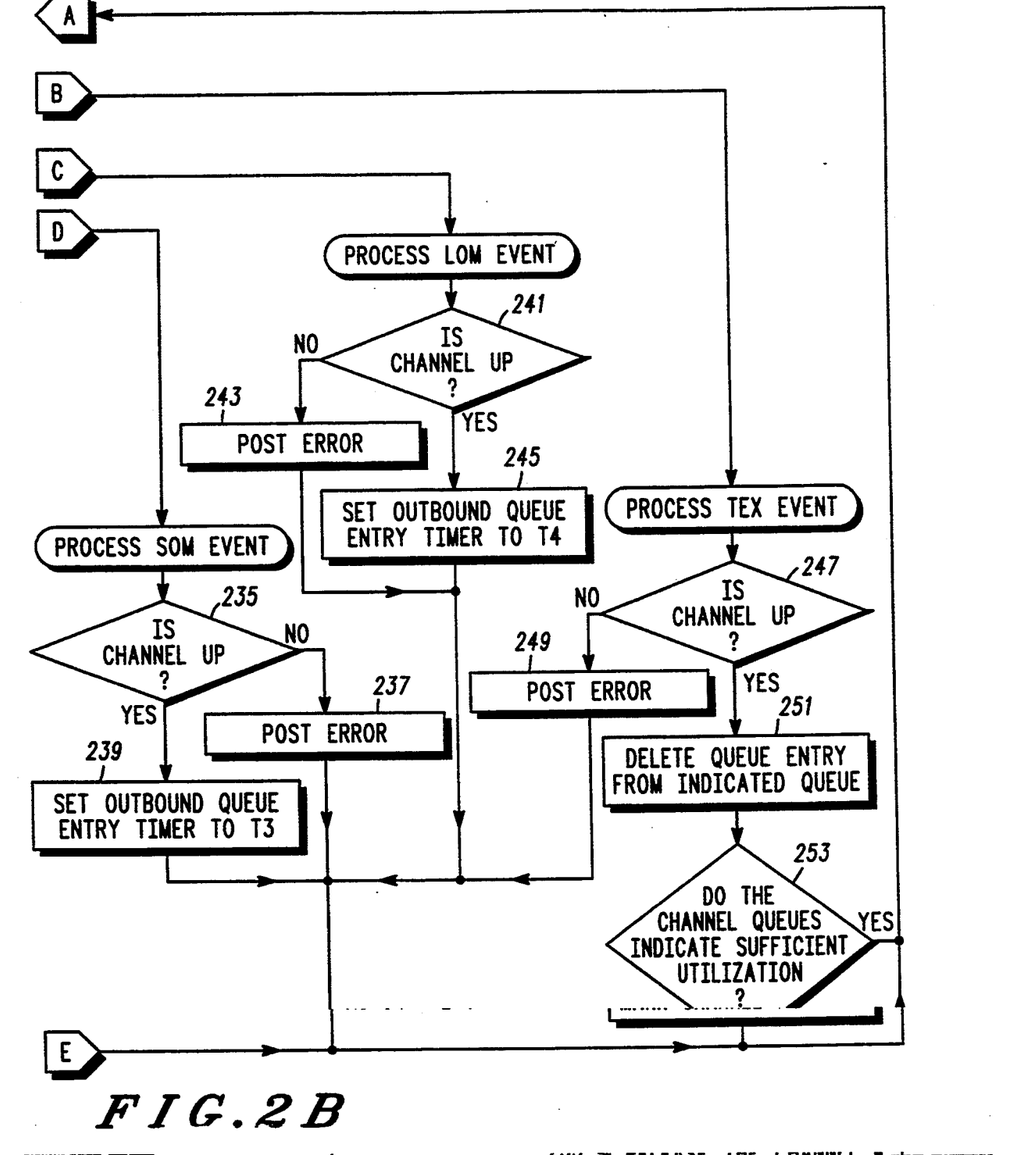

FIGS. 2A and 2B represent a flowchart depicting the process of the preferred embodiment to efficiently allocate channels. The following describes some terms used in FIGS. 2A and 2B. DCG represents an Individual Data Channel Grant being received by the process for a particular terminal. IMR represents the reception of an inbound data message from a particular terminal. CRM represents the reception of a Channel Registration Message from a particular terminal. SOM represents the initiation of Sending an Outbound Message to a particular terminal. LOM represents the initiation of sending the Last Outbound Message to a particular terminal. TEX represents a queue entry Timer Expiration for a particular terminal in a particular queue. T1 is the time value to wait for the first inbound terminal message. T2 is the time value to hang the channel after the first inbound message has been received. T3 is the time value to wait While transmitting an outbound message. T4 is the time value to hang the channel after the last, or final, outbound message has been sent. T1, T2, T3, and T4 represent the predetermined selection of timer values for the TDC. In the preferred embodiment of the invention, the timer values are T1=20 seconds, T2=0 seconds, T3=20 seconds, and T4=1 second. These timer values can be dynamically alterable.

FIGS. 2A and 2B show the specific tasks performed by the TDC in the preferred embodiment. Initially, the TDC waits (201) for one of six distinct significant events to occur: DCG, IMR, CRM, SOM, LOM, and TEX, as described in the previous paragraph. The occurrence of each event causes an applicable report, with the same name as the event it represents, to be sent to the TDC. When the report is received, it is evaluated (203) for type and passed to the appropriate process as described in the following paragraphs.

When a DCG event is received for a terminal, the terminal ID is checked (205) to see if it is on another channel's queue. If it is, the queue entry timer for that terminal on the other channel is set (207) to zero. That terminal ID is added (209) to this channel's Inbound queue, and the Inbound queue entry timer is set (211) to T1. The channel is marked (213) as up (i.e., seized), Inbound communications from the terminal begin (215), and the TDC returns to the wait state (201).

Receipt of an IMR event causes the TDC to examine (217) the channel state. If the channel is down, an error is posted (219) and the TDC returns to the wait state (201). If up, the Inbound queue entry timer is set (221) to T2, and the TDC returns to the wait state (201).

Receipt of a CRM event causes the TDC to examine (223) the channel state. If the channel is down, an error is posted (225) and the TDC returns to the wait state (201). If the channel is up, that terminal ID is deleted (227) from the Inbound queue. The terminal ID is added (229) to the Outbound queue and the Outbound queue entry timer is set (231) to T3. Outbound communications to the terminal begin (233), and the TDC returns to the wait state (201).

Receipt of an SOM event causes the TDC to examine (235) the channel state. If the channel is down, an error is posted (237) and the TDC returns to the wait state (201). If the channel is up, the Outbound queue entry timer is set (239) to T3, and the TDC returns to the wait state (201 ).

Receipt of an LOM event causes the TDC to examine (241) the channel state. If the channel is down, an error is posted (243) and the TDC returns to the wait state (201). If the channel is up, the Outbound queue entry timer is set (245) to T4 and the TDC returns to the wait state (201).

Receipt of a TEX event causes the TDC to examine (247) the channel state. If the channel is down, an error is posted (249) and the TDC returns to the wait state (201). If the channel is up, the TDC deletes (251) the terminal ID from the indicated queue. The TDC analyzes (253) the channel queues to see if they indicate sufficient utilization. If the level is achieved, the TDC returns to the wait state (201). Otherwise it releases (255) the channel, marks (257) the channel as down, and the TDC returns to the wait state (201).

We claim:

1. A communication system of at least two communication channels having at least two formats of messages to be sent from a central controller to a plurality of subscriber units, the communication system comprising:
   means for receiving a report of at least one significant message event;
   means, coupled to said means for receiving, for maintaining an inbound queue for a first communication channel, said inbound queue able to contain an identification of at least one subscriber unit requesting inbound communications in either or both of the at least two formats of messages and associating at least one queue timer with said identification;
   means, coupled to said means for receiving, for maintaining an outbound queue for said first communication channel, said outbound queue able to contain an identification of at least one subscriber unit requesting outbound communications in either or both of the at least two formats of messages and associating at least one queue timer with said identification;
   means, coupled to said means for receiving, for modifying said inbound queue and said outbound queue;
   means, coupled to said means for maintaining an inbound queue and said means for maintaining an outbound queue, for analyzing said inbound queue and said outbound queue to determine utilization of said first communication channel; and
   means, coupled to said means for analyzing, for releasing said first communication channel.

2. The communication system of claim 1 wherein said means for receiving further comprises
   means for evaluating said report of at least one significant message event.

3. The communication system of claim 2 wherein said means for evaluating further comprises
   means for marking the at least two communication channels with a channel state.

4. The communication system of claim 3 wherein said means for evaluating further comprises
   means for examining said channel state of the at least two communication channels.

5. The communication system of claim 1 wherein said means for maintaining an inbound queue and said means for maintaining an outbound queue each further comprise means for associating a message counter with said identification.

6. The communication system of claim 1 wherein said means for modifying further comprises
   means for adding said identification to said inbound queue when appropriate;
   means for adding said identification to said outbound queue when appropriate.

7. The communication system of claim 1 wherein said means for modifying further comprises:
   means for deleting said identification from said inbound queue when appropriate;
   means for deleting said identification from said outbound queue when appropriate.

8. The communication system of claim 1 further comprising:
   means coupled to said means for receiving, for maintaining an inbound queue for a second communication channel;
   means coupled to said means for maintaining an inbound queue for a second communication channel, for checking for said identification in said inbound queue for said second communication channel; and
   means, coupled to said means for checking, for causing said identification to be removed from said inbound queue for said second communication channel.

9. The communication system of claim 1 further comprising:
   means for indicating that a unit is ready to receive;
   means, coupled to said means for indicating, for removing said identification from said inbound queue; and
   means for adding said identification to an outbound queue.

10. A method of channel allocation in a communication system of at least two communication channels having at least two formats of messages to be sent from a central controller to a plurality of subscriber units, comprising the steps of:
    receiving a report of at least one significant message event;
    maintaining, responsive to said receiving, an inbound queue containing for a first communication channel, said inbound queue able to contain an identification of at least one subscriber unit requesting inbound communications in either or both of the at least two formats of messages and associating at least one queue timer with said at least one identification and associating a message counter with said identification;
    maintaining, responsive to said receiving, an outbound queue for said first communication channel, said outbound queue able to contain an identification of at least one subscriber unit requesting outbound communications in either or both of the at least two formats of messages and associating at least one queue timer with said identification;
    modifying, responsive to said receiving, said inbound queue and said outbound queue;
    analyzing, responsive to said maintaining an inbound queue and said maintaining an outbound queue, said inbound queue and said outbound queue to determine utilization of said first communications channel; and releasing, responsive to said analyzing, said first communication channel.

11. The method of claim 10 wherein said receiving step further comprises the step of
    evaluating said report of at least one significant message event.

12. The method of claim 11 wherein said evaluating step further comprises the step of
    marking the at least two communication channels with a channel state.

13. The method of claim 12 wherein said evaluating step further comprises the step of
examining said channel state of the at least two communication channels.

14. The method of claim 10 wherein said maintaining an inbound queue and said maintaining an outbound queue each further comprise the step of associating a message counter with said identification.

15. The method of claim 10 wherein said modifying step further comprises the step of
adding said identification to said inbound queue when appropriate;
adding said identification to said outbound queue when appropriate.

16. The method of claim 10 wherein said modifying step further comprises the steps of:
deleting said identification from said inbound queue when appropriate;
deleting said identification from said outbound queue when appropriate.

17. The method of claim 10 further comprising the steps of:
maintaining an inbound queue for a second communication channel;
checking for said identification in said inbound queue for said second communication channel; and
causing said identification to be removed from said inbound queue for said second communication channel.

18. The method of claim 10 further comprising the steps of:
indicating that a unit is ready to receive;
removing, responsive to said step of indicating, said identification from said inbound queue; and
adding said identification to an outbound queue.

19. A communication system of at least two communication channels having at least two formats of messages to be sent from a central controller to a plurality of subscriber units, the communication system comprising:
means for receiving a report of at least one significant message event;
means for evaluating said report of at least one significant message event;
means, coupled to said means for evaluating, for marking a first communication channel with a channel state;
means, coupled to said means for evaluating, for maintaining an inbound queue for said first communication channel, said inbound queue able to contain an identification of at least one subscriber unit requesting inbound communications in either or both of the at least two formats of messages and associating at least one queue timer with said identification;
means, coupled to said means for evaluating, for maintaining an outbound queue for said first communication channel, said outbound queue able to contain an identification of at least one subscriber unit requesting outbound communications in either or both of the at least two formats of messages and associating at least one queue timer with said identification;
means, coupled to said means for evaluating, for adding said identification to said inbound queue when appropriate;
means, coupled to said means for evaluating for adding said identification to said outbound queue when appropriate;
means, coupled to said means for evaluating, for deleting said identification from said inbound queue when appropriate;
means, coupled to said means for evaluating, for deleting said identification from said outbound queue when appropriate;
means, coupled to said means for receiving, for maintaining an inbound queue for a second communication channel;
means, coupled to said means for evaluating, for checking for said identification in said inbound queue for said second communication channel;
means, coupled to said means for checking, for causing said identification to be removed from said inbound queue for said second communication channel;
means for indicating that a unit is ready to receive;
means, coupled to said means for indicating, for removing said identification from said inbound queue;
means for adding said identification to an outbound queue;
means, coupled to said means for evaluating, for examining said channel state of said first communication channel;
means, coupled to said means for examining, for analyzing said inbound queue and said outbound queue to determine utilization of said first communication channel; and
means, coupled to said means for analyzing, for releasing said first communication channel.

20. A method of channel allocation in a communication system of at least two communication channels having at least two formats of messages to be sent from a central controller to a plurality of subscriber units, comprising the steps off
receiving a report of at least one significant message event;
evaluating said report of at least one significant message event;
marking a first communication channel with a channel state, responsive to said evaluating;
maintaining, responsive to said evaluating, an inbound queue for said first communication channel, said inbound queue able to contain an identification of at least one subscriber unit requesting inbound communications in either or both of the at least two formats of messages and associating at least one queue timer with said identification;
maintaining, responsive to said evaluating, an inbound queue for said first communication channel, said inbound queue able to contain an identification of at least one subscriber unit requesting inbound communications in either or both of the at least two formats of messages and associating at least one queue timer with said identification;
adding, responsive to said evaluating, said identification to said inbound queue when appropriate;
adding, responsive to said evaluating, said identification to said outbound queue when appropriate;
deleting, responsive to said evaluating, said identification from said inbound queue when appropriate;
deleting, responsive to said evaluating, said identification from said outbound queue when appropriate;

maintaining an inbound queue for a second communication channel;

checking, responsive to said evaluating, for said identification in said inbound queue for said second communication channel;

causing said identification to be removed from said inbound queue for said second communication channel;

means for indicating that a unit is ready to receive;

removing, responsive to said indicating, said identification from said inbound queue;

adding said identification to an outbound queue;

examining, responsive to said evaluating, said channel state of said first communication channel;

analyzing, responsive to said examining, said inbound queue and said outbound queue to determine utilization of said first communication channel; and releasing, responsive to said analyzing, said first communication channel.

21. A communication system of at least two communication channels having at least two formats of messages to be sent from a central controller to a plurality of subscriber units, the communication system comprising:

means for receiving a grant for a first channel for a subscriber unit having an identification;

means, coupled to said means for receiving, for adding said identification to an inbound queue for said first channel;

means, coupled to said means for adding, for starting an inbound timer associated with said identification and having a first time value;

means for receiving an inbound message;

means, coupled to said means for receiving said inbound message, for setting said inbound timer with a second time value; and means for removing said identification from said inbound queue whenever said inbound timer expires.

22. The communication system of claim 21 wherein said means for adding further comprises:

means for checking for said identification in an inbound queue for a second channel; and means, coupled to said means for checking, for causing said identification to be removed from said inbound queue for said second channel.

23. The communication system of claim 21 wherein said means for removing further comprises:

means for removing said identification from said inbound queue after receiving a channel registration message; and means for adding said identification to an outbound queue.

24. The communication system of claim 23 further comprising means for deallocating said first channel when said inbound queue and said outbound queue reach a predetermined level, reflecting that usage of said first channel has fallen below sufficient utilization for said first channel.

25. The communication system of claim 23 wherein said means for adding further comprises:

means for forwarding at least one outbound message to said subscriber unit;

means, responsive to said means for forwarding, for starting an outbound timer associated with said identification and having a third time value;

means for setting said inbound timer with said third time value each time an outbound message is forwarded; and means for removing said identification from said outbound queue whenever said outbound timer expires.

26. The communication system of claim 25 wherein said means for removing further comprises:

means for associating a message counter with said identification;

means for decrementing said message counter whenever an outbound message is forwarded to said subscriber unit; and means for removing said identification from said outbound queue whenever said message counter has a value of zero.

27. A method of channel allocation in a communication system of at least one communication channel having at least two formats of messages to be sent from a central controller to a plurality of subscriber units, comprising the steps of:

receiving a grant for a first channel for a subscriber unit having an identification;

adding, responsive to said receiving, said identification to an inbound queue for said first channel;

starting, responsive to said adding, an inbound timer associated with said identification and having a first time value;

receiving an inbound message;

setting, responsive to said receiving said inbound message, said inbound timer with a second time value; and removing said identification from said inbound queue whenever said inbound timer expires.

28. The method of claim 27 wherein said adding step further comprises the steps of:

checking for said identification in an inbound queue for a second channel; and causing, responsive to said checking step, said identification to be removed from said inbound queue for said second channel.

29. The method of claim 27 wherein said removing stop further comprises steps of:

removing said identification from said inbound queue after receiving a channel registration message; and adding said identification to an outbound queue.

30. The method of claim 29 further comprising the step of deallocating said first channel when said inbound queue and said outbound queue reach a predetermined level, reflecting that usage of said first channel has fallen below sufficient utilization for said first channel.

31. The method of claim 29 wherein said adding step further comprises the steps of:

forwarding at least one outbound message to said subscriber unit;

starting, responsive to said forwarding, an outbound timer associated with said identification and having a third time value;

setting said inbound timer with said third time value each time an outbound message is forwarded; and removing said identification from said outbound queue whenever said outbound timer expires.

32. The method of claim 31 wherein said removing further comprises the steps of:

associating a message counter with said identification;

decrementing said message counter whenever an outbound message is forwarded to said subscriber unit; and removing said identification from said outbound queue whenever said message counter has a value of zero.

* * * * *

UNITED STATES PATENT AND TRADEMARK OFFICE
CERTIFICATE OF CORRECTION

PATENT NO. : 5,420,574

DATED : May 30, 1995

INVENTOR(S) : Paul M. Erickson; Leopold Alonso, Timothy J. Wilson, Angela T. Johnston It is certified that error appears in the above-identified patent and that said Letters Patent is hereby corrected as shown below:

In claim 29, line 39, the word "stop" should be --step--.

Delete sheet 3 of the drawings and substitute therefor attached sheet 3 of 3.

Signed and Sealed this

Twentieth Day of February, 1996

Attest:

BRUCE LEHMAN

*Attesting Officer*   Commissioner of Patents and Trademarks

FIG.2B